March 20, 1956 R. L. MYERS 2,738,760

REELED TAPE INDICATING DEVICE

Filed Feb. 14, 1955

INVENTOR.
Raymond L. Myers
BY
Clayton L. Jenks
ATTORNEY

United States Patent Office 2,738,760

Patented Mar. 20, 1956

2,738,760

REELED TAPE INDICATING DEVICE

Raymond L. Myers, Holden, Mass., assignor to The Wright Line, Inc., Worcester, Mass., a corporation of Massachusetts Application February 14, 1955, Serial No. 488,078

5 Claims. (Cl. 116—135)

This invention relates to an indicating device, and more particularly, it is a device which indicates the status of a reeled tape and secures the tape on a reel.

Various types of tape used in a business machine, as well as photographic films and other forms of tape, are customarily mounted on reels, and it is often desirable that each reel bear a label indicating the reeled contents as well as an indication as to the status of the tape. For example, it may be needed to know whether a magnetic tape for use in a business machine has served its purpose and may be reused, or whether the tape is to be stored temporarily or longer for an active or a future use.

The primary object of the invention is to satisfy such requirements and to provide a clip which may be releasably attached to the periphery of a reel outside of the tape thereon and which comprises a signal system that may be manually set to show the condition of the tape.

Further objects comprise providing a clip construction which may be removably attached to a tape reel and manually set to indicate the status or condition of the tape on the reel. Other objects will be apparent in the following disclosure.

My preferred construction comprises a demountable clip which may serve as a label holder and to secure the free end of the reeled tape and which has a manually settable slide bearing different colors or designations that may be rendered visible through a single window to indicate the condition or status of the reel tape. For example, I may employ the standard signal colors used for controlling traffic, in which the color green indicates that the tape may be reused for other purposes, the color yellow indicates a storage requirement and notice that the record on the tape is temporarily useful, and the color red indicates that the tape is in an active usable condition and should be protected and preserved in that condition.

Referring to the drawings illustrating one embodiment of the invention:

Various types of tape, such as magnetic tape records, punched tape for controlling the operation of machines and photographic film, are customarily mounted on spools or reels which are usually made of sheet metal and comprise a central cylindrical post on which the tape is wound between two disk shaped flanges forming the sides of the reel. It is often necessary to known the condition of the tape or its status relative to its uses, and for this purpose I have provided a clip which is removably mounted on the reel and serves both to hold the loose end of the tape from unwinding as well as to give an indicating signal of the tape status. The spaced flanges 10 of the reel which confine the tape on its supporting center post provide an open peripheral space for unwinding the tape. The clip may be removably mounted at any desired location around the outer margin or periphery of the reel flanges.

Figure 3:
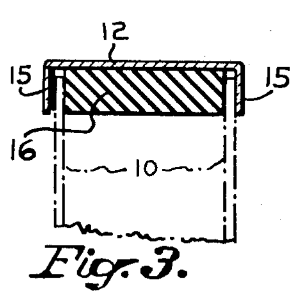
Fig. 3 is a sectional detail taken on the line 3—3 of Fig. 2 showing the frictional grip mounting of the clip associated with the two side flanges of a reel.

This clip comprises a sheet metal body plate 12 bent into an arcuate shape which insures its fitting substantially against the outer curved peripheries of the two flanges 10 of the reel. The plate has downwardly bent flanges 14 and 15 near its opposite ends which are spaced so that they will fit closely outside of the reel flanges 10. A frictional grip to hold the clip in place on the reel flanges is formed of a block of rubber 16 which is cemented in the under side of the trough formed by the two spaced flanges 15 at the left hand end of the clip shown in Fig. 1. This rubber is made of suitable material to provide sufficient resiliency for the purpose, and is of such a size that it is slightly compressed against the inner sides of the reel flanges 10 when the plate is assembled on the top of the reel as shown in Fig. 3. The rubber is spaced from the flanges 15 to provide room for the reel flanges 10. The frictional grip of both the rubber 16 and the flanges 15 insures that the clip is held in place for normal use but may be removed when desired.

To the right of that rubber and flange mounting, the top plate 12 is bent upwardly and inwardly to form two spaced flanges 18 which have horizontal portions parallel with and spaced from the top surface of the plate 12. The space under the horizontal flange portions is sufficient to permit the insertion of a label card intended to bear suitable indicia for identifying the reel contents and yet hold the card frictionally in a fairly snug fit so that it will not easily slide out.

A primary feature of this invention comprises the provision of identification insignia which are intended to designate the status of the tape on the reel. This comprises an inner slide plate 20 (Fig. 8) which bears indicators, such as colors 21, 22, 23 which, according to the showing in the drawings, are respectively green, yellow and red. These rectangular patches of color indicators are of the substantially same area, and the slide plate 20 is so arranged that a selected one of the three colors may be shown through a window 24 of similar size in the top surface of the outer plate 12. The color that is visible is intended to indicate the status of the tape to the user of the reel.

In order that any desired one of these colors may be readily moved into view, the window is provided with two centrally located side recesses 26, and the slide 20 is provided with the openings 27 therethrough located respectively between the outer colors red and green and the inner yellow color. The recesses 26 and holes 27 are of such size as to receive the point of a lead pencil or other pointer and permit the operator to move the slide 20 to one of the three positions for showing any desired color.

Figures 1, 2:
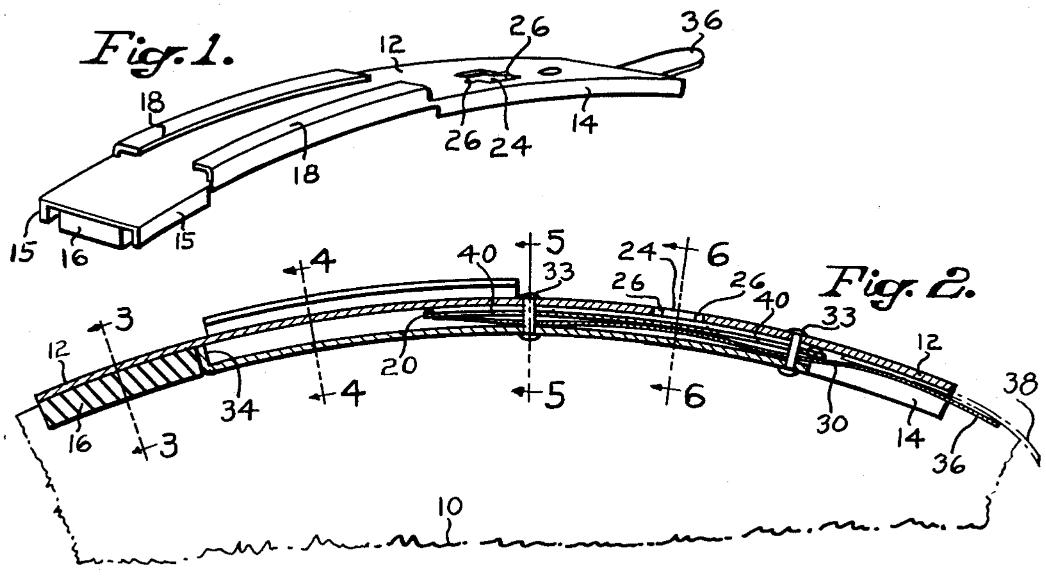
Fig. 1 is a perspective view of the signaling clip.
Fig. 2 is a longitudinal sectional view of the clip with a reel indicated by broken lines.
Figure 4:
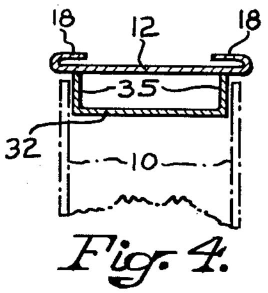
Fig. 4 is a similar detail taken on the line 4—4 of Fig. 2.
Figure 5:
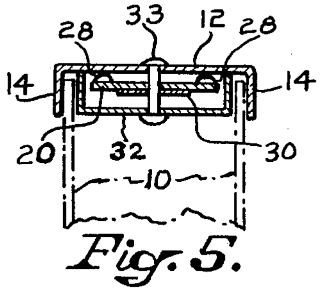
Fig. 5 is a detail taken on the line 5—5 of Fig. 2.
Figure 6:
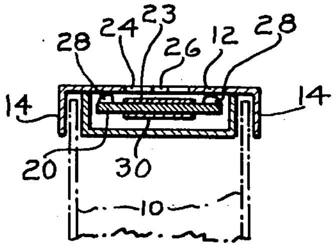
Fig. 6 is a detail taken on the line 6—6 of Fig. 2.

To provide for a frictional resistance against sliding movement of the slide 20, the slide plate has four dimples or buttons 28 pressed up from its surface, as shown in Figs 5 and 6, which frictionally ride on the under side of plate 12. The slide plate is held in that frictional condition by means of a flat spring 30 therebeneath. To hold the spring and slide in place, a trough or U-shaped body 32 is secured as by rivets 33 (Fig. 5) to the top plate 12. This trough member has a flange 34 (Fig. 2) at its left hand end which is clamped by the rivets 33 against the plate 12, and this flange serves as an end plate which locates the rubber block 16. The side flanges 35 (Fig. 4) of this trough 32 likewise press against the under side of the plate 12. The right hand end of the trough 32 is open, as indicated in Fig. 2, and the spring 30 projects outwardly through that opening. The spring, as indicated in Fig. 2, has a wavy shape and is made of resilient metal so that it presses at the left hand end against the slide plate 20 (Fig. 2) and intermediate of the slide and again at its right hand end, so that the slide is held with its dimples 28 pressed upwardly in sliding contact with the under side of the plate 12.

The outer right hand end 36 of the spring projects outwardly well beyond the clip body 12 and it normally tends to lie against the under face of the clip body. The free end 38 of the reel tape may be brought around and threaded into the space between the top of the spring end 36 and the clip 12. The spring is bowed up at that point sufficiently to give a strong frictional grip on the tape and thus hold the tape firmly in position and so prevent it from unwinding from the reel. The trough 32 is sufficiently narrow so that it will fit downwardly in the space between the reel flanges 10 and it may engage and provide a frictional grip therewith, but it is preferred to have the tape 38 serve to hold the right hand end of the clip down in place on the reel.

Figure 7:
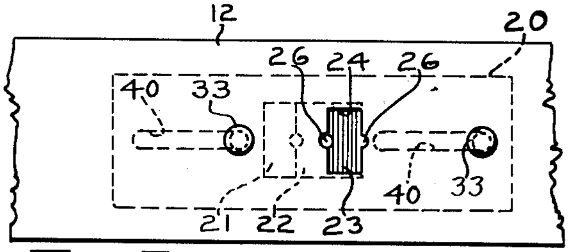
Fig. 7 is a fragmentary top view of the right hand portion of Fig. 1 showing one of the signals exposed in the sight opening.
Figure 8:
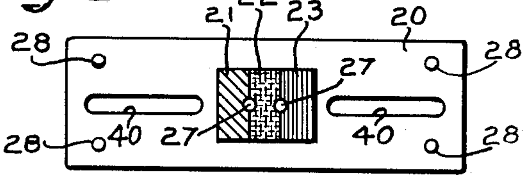
Fig. 8 is a plan view of the slide which carries the signal colors.

The slide 20, as shown in Fig. 8, is provided with two elongated slots 40 within which are located the shanks of the rivets 33, as shown particularly in Figs. 2 and 7. Hence, the clip may move only to the distance limited by the length of these slots or sufficient to show either one of the two outside colors green and red. Hence, the structure is such that the slide 20 may be moved by a pencil point inserted in the holes 27 successively to move the slide from one exposed end color to the other. The pointer moves each time into one of the recesses 26 in the window side and so exposes only the full area of the selected color, since the holes 27 are centered on the dividing lines between the colors.

The operation of the device has been explained above. Also, it will be appreciated that various modifications may be made within the scope of the outlined principles of this invention; hence, the above disclosure is not to be interpreted as imposing limitations on the appended claims.

I claim:

1. A reeled tape indicating device for a tape supporting reel having spaced flanges comprising a clip shaped to interfit with a peripheral portion of the flanges, means for removably holding the clip on the reel flanges, a slide mounted on the clip which has indicators thereon, said clip having a window through which one of the indicators may be seen, and means for moving the slide to expose the selected indicator in the window.

2. A reeled tape indicating device for a tape supporting reel having spaced flanges comprising a clip having flanges shaped to interfit with the outsides of the reel flanges, a resilient block mounted on the under side of said clip which is arranged to grip the inner sides of the reel flanges frictionally and hold the clip in place, a slide mounted on the clip which has indicators thereon, said clip having a window through which one of the indicators may be seen, and means for moving the slide to expose the selected indicator in the window.

3. A reeled tape indicating device for a reel having a post on which a tape is wound and two spaced flanges comprising a plate shaped to be mounted on a peripheral portion, means for removably mounting the plate on the flanges, a label holder on the plate, an indicator slide movably mounted on the plate for displaying one of several indications of tape status, and resilient means on the plate for removably securing the free end of the tape to the plate.

4. A reeled tape indicating device for a reel having a post on which a tape is wound and two spaced flanges comprising a clip having flanges shaped to interfit with the outsides of the flanges, a resilient rubber body on the under side of the clip which frictionally engages the inner sides of the reel flanges and removably secures the clip in place, a slide mounted on the under side of the clip having indicators thereon, the clip having means for displaying one of the indicators, and a flat spring at one end of the clip for removably securing the free end of the tape to the clip.

5. A device according to claim 4 in which the slide indicators are arranged in a series and the slide has holes therethrough located between the indicators for receiving the end of a pointer, and the clip has a window of the size of an indicator through which the pointer may be inserted for moving the slide, said window being arranged to display only one indicator at a time.

References Cited in the file of this patent

UNITED STATES PATENTS 2,420,832 Merkur ---------------- May 20, 1947

FOREIGN PATENTS 187,077 Switzerland ------------- Jan. 2, 1937